United States Patent
Su et al.

(10) Patent No.: US 11,627,648 B2
(45) Date of Patent: Apr. 11, 2023

(54) LIGHTING APPARATUS

(71) Applicant: LEEDARSON LIGHTING CO., LTD., Fujian (CN)

(72) Inventors: Wenkun Su, Fujian (CN); Shihai Huang, Fujian (CN); Hongkui Jiang, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 17/676,414

(22) Filed: Feb. 21, 2022

(65) Prior Publication Data

US 2022/0272810 A1    Aug. 25, 2022

(30) Foreign Application Priority Data

Feb. 21, 2021  (CN) .......................... 202120384193.0
Feb. 21, 2021  (CN) .......................... 202120384410.6
Feb. 21, 2021  (CN) .......................... 202120384660.X

(51) Int. Cl.
  *H05B 45/345*   (2020.01)
  *H05B 45/37*    (2020.01)
  *H05B 45/20*    (2020.01)
  *H05B 47/19*    (2020.01)

(52) U.S. Cl.
  CPC ............ *H05B 45/37* (2020.01); *H05B 45/20* (2020.01); *H05B 45/345* (2020.01); *H05B 47/19* (2020.01)

(58) Field of Classification Search
  CPC ...... H05B 45/20; H05B 45/37; H05B 45/345; H05B 47/19; Y02B 20/40
  See application file for complete search history.

(56) References Cited

U.S. PATENT DOCUMENTS

| | | | | |
|---|---|---|---|---|
| 9,173,273  | B2 * | 10/2015 | Zudrell-Koch | .... H05B 45/3725 |
| 9,338,853  | B2 * | 5/2016  | Guang        | .................. F21V 23/009 |
| 11,255,528 | B1 * | 2/2022  | Lu           | .............. F21K 9/278 |
| 2017/0321849 | A1 * | 11/2017 | Xiong      | .................... F21V 15/015 |
| 2022/0104320 | A1 * | 3/2022  | Jiang       | ...................... H05B 45/10 |
| 2022/0183131 | A1 * | 6/2022  | Liu         | ...................... H05B 47/165 |

* cited by examiner

*Primary Examiner* — Haissa Philogene
(74) *Attorney, Agent, or Firm* — Chun-Ming Shih; Lanway IPR Services

(57) ABSTRACT

A lighting apparatus includes an AC-DC converter, multiple LED modules, a mixing unit, a controller and a power supply. The AC-DC converter converts an AC power source to a DC output. The multiple LED modules have different light parameters. The mixing unit is coupled to the multiple LED modules for mixing a mixed light parameter according to a control signal by supplying driving currents to the multiple LED modules corresponding to the mixed light parameter. The mixing unit receives the DC output to generate the driving currents. The controller generates the control signal. The power supply receives the DC output to generate a working power to the controller. When the AC-DC converter is turned off, a releasing power of the mixing unit is moved to the power supply to align turn-off timings of the power supply and the mixing unit.

20 Claims, 7 Drawing Sheets

LIGHTING APPARATUS

FIELD

The present invention is related to a lighting apparatus, and more particularly related to a lighting apparatus with a consistent control.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

There is a trend to make light devices more flexible to easier to be controlled to interact with other devices. In such case, a light device may receive an external command and trigger a corresponding control.

In such case, the light source and a controller for controlling the light source may be connected to different paths.

In such case, the two paths may cause turn-on and turn-off timing difference. Such timing difference may cause color temperature or color changing unstable. Such problem may be noticed visually and it is therefore beneficial to find a novel way to solve such problem to enhance light devices.

SUMMARY

In some embodiments, a lighting apparatus includes an AC-DC converter, multiple LED modules, a mixing unit, a controller and a power supply.

The AC-DC converter converts an AC power source to a DC output.

The multiple LED modules have different light parameters.

The mixing unit is coupled to the multiple LED modules for mixing a mixed light parameter according to a control signal by supplying driving currents to the multiple LED modules corresponding to the mixed light parameter.

The mixing unit receives the DC output to generate the driving currents.

The controller generates the control signal.

The power supply receives the DC output to generate a working power to the controller.

When the AC-DC converter is turned off, a releasing power of the mixing unit is moved to the power supply to align turn-off timings of the power supply and the mixing unit.

In some embodiments, the DC output is coupled to a common capacitor shared by the power supply and the mixing unit.

In some embodiments, a Zener diode is disposed between the common capacitor and the DC output to speed up a turn-off response timing.

In some embodiments, a first end of a first capacitor is connected to the DC output and a second end of the first capacitor is connected to ground.

In some embodiments, a first diode is placed between the DC output and the first end of the first capacitor.

In some embodiments, a first end of a Zener diode is connected to the first end of the first capacitor.

A second end of the Zener diode is connected to an input of the power supply.

In some embodiments, an anode of the first diode is connected to a first end of a second capacitor.

A second end of the second capacitor is connected to the ground.

In some embodiments, the first end of the second capacitor is connected to the input of the power supply.

In some embodiments, a first end of a second capacitor is connected to an input of the power supply.

A second end of the second capacitor is connected to the ground.

In some embodiments, the first end of the second capacitor is connected to an input of the mixing unit.

In some embodiments, the input of the mixing unit are coupled to the input of the power supply.

In some embodiments, the controller includes a wireless receiver for receiving an external command.

The controller decodes the wireless command to generate multiple control signals corresponding to the driving currents supplied to the multiple LED modules.

In some embodiments, the mixing unit includes a constant current source controlled by the multiple control signals.

In some embodiments, the controller has a wall switch input for connecting to a wall switch.

The an operation of the wall switch triggers a control operation to the multiple LED modules.

In some embodiments, the controller adjusts the multiple control signals by reference to the operation of the wall switch.

In some embodiments, the AC-DC converter includes a bridge circuit.

In some embodiments, the mixed light parameter includes a mixed color temperature.

In some embodiments, the light light parameter further includes a mixed color.

In some embodiments, the controller references a mapping table defining a relation between the mixed color temperature and the mixed color.

In some embodiments, the controller determines the mixed color according to the mixed color temperature and the mapping table.

DETAILED DESCRIPTION

Figure 6:
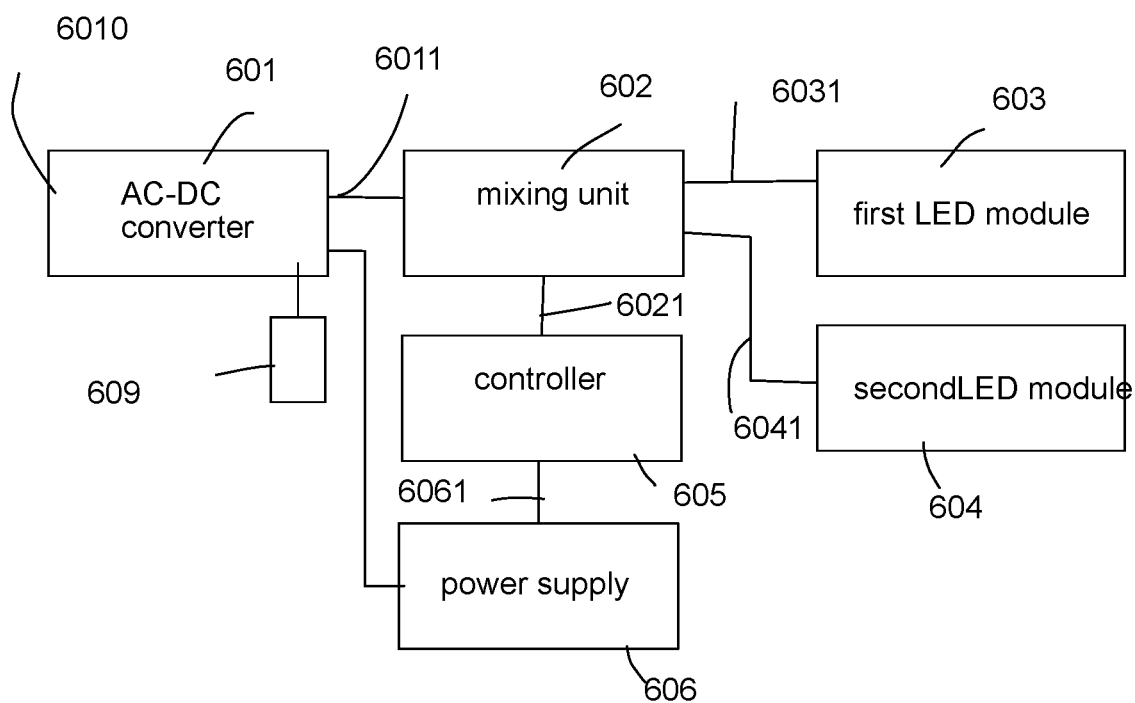
FIG. 6 shows a lighting apparatus example.

In FIG. 6, a lighting apparatus includes an AC-DC converter 601, multiple LED modules, a mixing unit 602, a controller 605 and a power supply 606. The AC-DC converter is a circuit that converts an external AC (Alternating Current) power to a DC (Direct Current) power. For example, the AC-DC converter 601 may converts an 110V AC power to a DC power.

In FIG. 6, the multiple LED modules has a first LED module 603 and a second LED module 604. More than two LED modules with different light parameters may be disposed according to different requirements. For example, a red LED module, a green LED module and a blue LED module may be used for mixing different colors.

In other embodiments, the LED modules may include white LED modules with different color temperatures. For example, the LED modules may include a LED module emitting a white light with a warm color temperature, and another LED module emitting a white light with a cold temperature.

The AC-DC converter converts an AC power source 6010 to a DC output 6011.

The multiple LED modules have different light parameters.

The mixing unit is coupled to the multiple LED modules for mixing a mixed light parameter according to a control signal 6021 by supplying driving currents 6031, 6041 to the first LED module 603 and the second LED module 604 corresponding to the mixed light parameter.

The mixing unit 602 receives the DC output 6011 to generate the driving currents 6031, 6041.

The controller 605 generates the control signal 6021.

The power supply 606 receives the DC output 6011 to generate a working power 6061 to the controller 6021.

When the AC-DC converter 601 is turned off, a releasing power of the mixing unit 602 is moved to the power supply 606 to align turn-off timings of the power supply 605 and the mixing unit 606.

For example, the mixing unit 602 may be coupled to a first power path that has a capacitor to stabilize the power supply to the mixing unit. When the AC-DC converter is turned-off, the capacitor may cause a releasing power that remains the LED modules to emit light.

In this embodiment, the releasing power is guided to the power supply 606 to keep the power supply 606 to continue working so as to keep the emitting light under control by the controller 605.

Without such design, the controller 606 may lose power and thus stops supplying correct control signal to the mixing unit 602. In such case, the mixing unit 602 may generate random currents to the LED modules and thus cause undesired light output.

In FIG. 6, the DC output is coupled to a common capacitor 609 shared by the power supply 606 and the mixing unit 602. With the common capacitor 609, when the AC-DC converter 601 is turned-off, the common capacitor shares a releasing power to the power supply 606 so that the power supply 606 continues to provide correct control signal.

Figure 7:
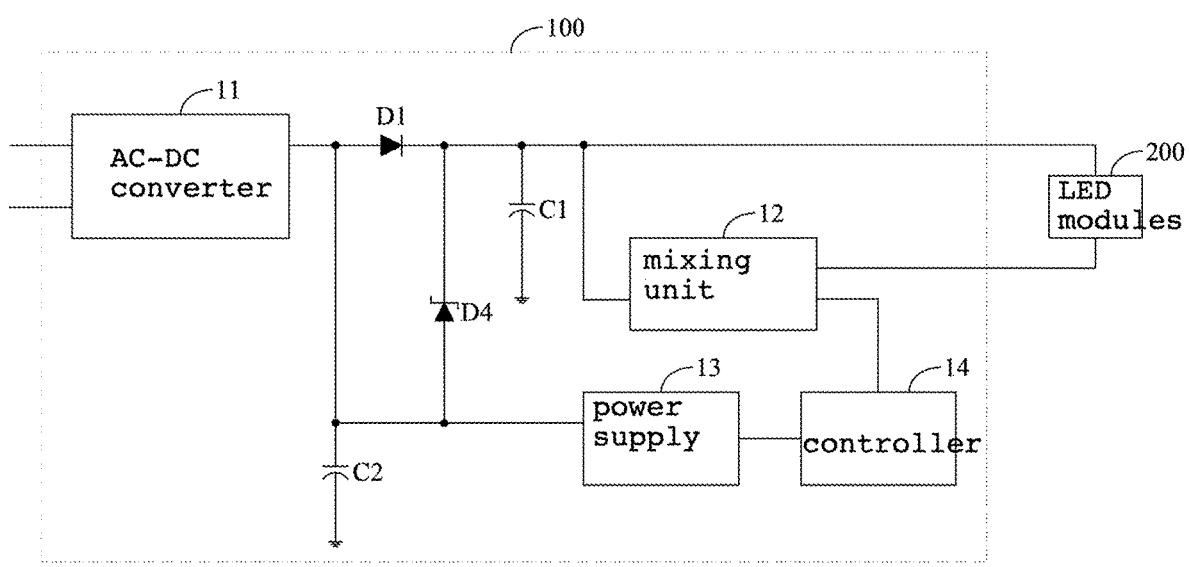
FIG. 7 shows another lighting apparatus circuit.

FIG. 7 shows a first detailed embodiment of a lighting apparatus.

In FIG. 7, a Zener diode D4 is disposed between the common capacitor C1 and the DC output of the AC-DC converter 11 to speed up a turn-off response timing.

In some embodiments, a first end of a first capacitor C1 is connected to the DC output of the AC-DC converter 11 and a second end of the first capacitor C1 is connected to ground.

In some embodiments, a first diode D1 is placed between the DC output of the AC-DC converter and the first end of the first capacitor C1.

In some embodiments, a first end of a Zener diode D4 is connected to the first end of the first capacitor C1.

A second end of the Zener diode D4 is connected to an input of the power supply 13.

In some embodiments, an anode of the first diode D1 is connected to a first end of a second capacitor C2.

A second end of the second capacitor C2 is connected to the ground.

In some embodiments, the first end of the second capacitor C2 is connected to the input of the power supply 13.

In some embodiments, a first end of a second capacitor C2 is connected to an input of the power supply 13.

A second end of the second capacitor C2 is connected to the ground.

Figure 5:
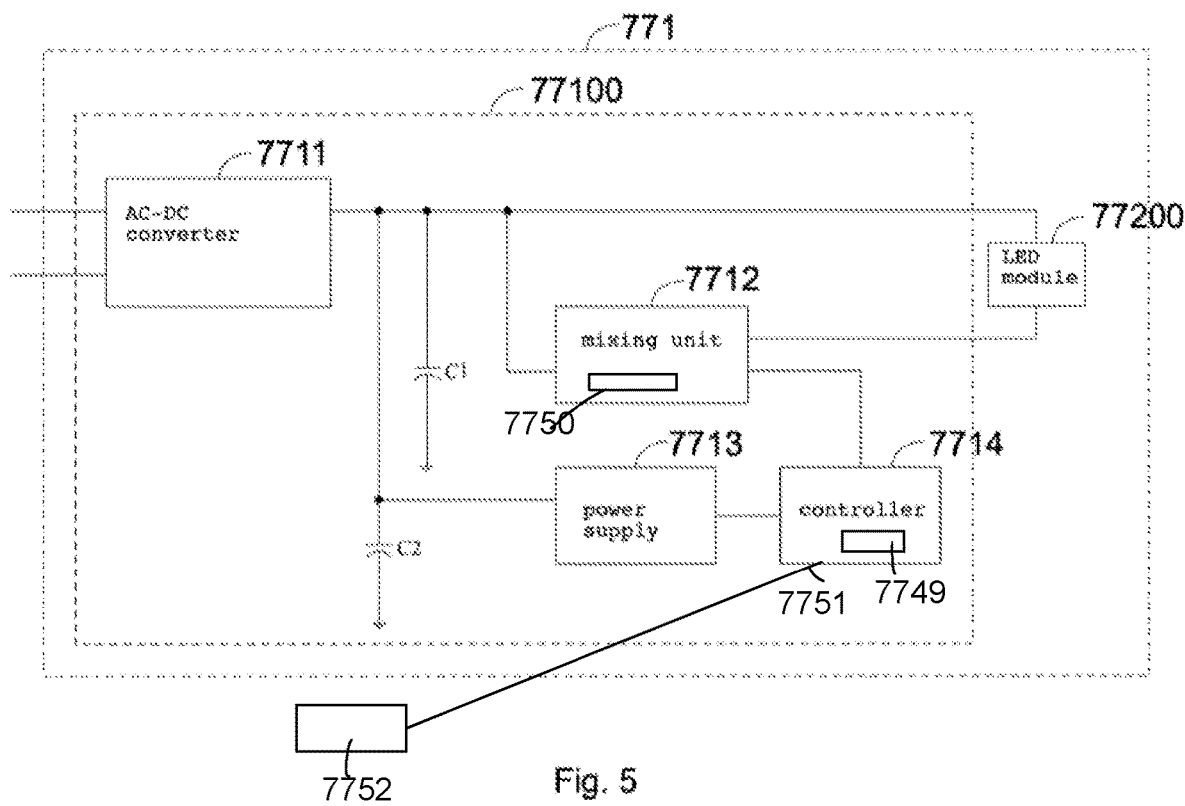
FIG. 5 illustrates another circuit embodiment of a lighting apparatus.

FIG. 5 shows another lighting apparatus. In FIG. 5, the first end of the second capacitor C2 is connected to an input of the mixing unit 7712.

In some embodiments, the input of the mixing unit 7712 are coupled to the input of the power supply 7713.

In some embodiments, the controller 7714 includes a wireless receiver 7749 for receiving an external command.

The controller decodes the wireless command to generate multiple control signals corresponding to the driving currents supplied to the multiple LED modules 77200.

In some embodiments, the mixing unit 7712 includes a constant current source 7750 controlled by the multiple control signals.

In some embodiments, the controller has a wall switch input 7751 for connecting to a wall switch 7752, e.g. a rotation switch or an on-off button.

The operation of the wall switch triggers a control operation to the multiple LED modules 77200.

In some embodiments, the controller adjusts the multiple control signals by reference to the operation of the wall switch 7752.

Figure 4:
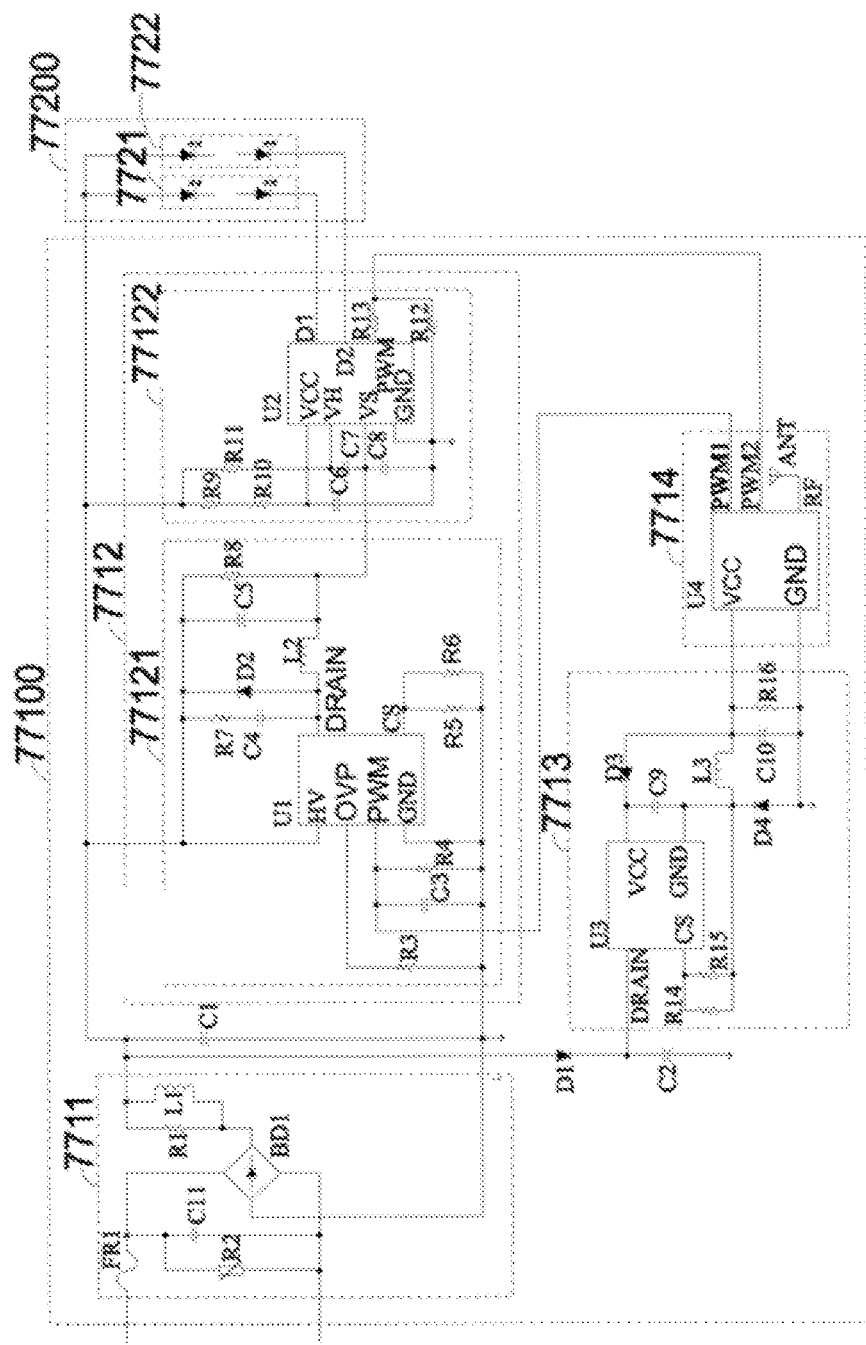
FIG. 4 illustrates a circuit example of a lighting apparatus.

In FIG. 4, which shows a detailed circuit example, the AC-DC converter includes a bridge circuit BD1.

In some embodiments, the mixed light parameter includes a mixed color temperature.

In some embodiments, the light light parameter further includes a mixed color.

In some embodiments, the controller references a mapping table defining a relation between the mixed color temperature and the mixed color.

In some embodiments, the controller determines the mixed color according to the mixed color temperature and the mapping table.

In such design, when a user assigns a color temperature, a corresponding color is obtained by reference to the table. When a request to indicate a mixed color temperature, a corresponding color is chosen by reference to the mapping table and then automatically controls corresponding driving currents to generate a corresponding mixed light parameter.

Figure 1:
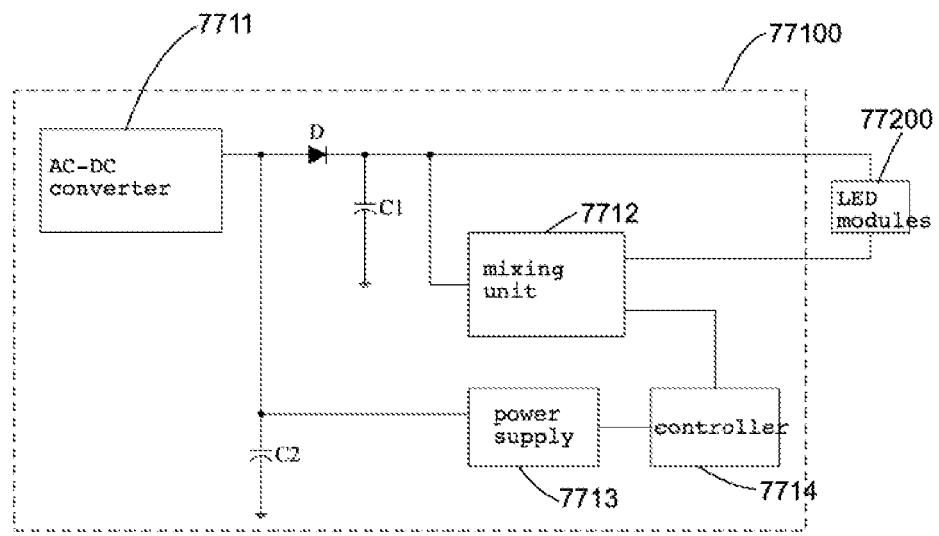
FIG. 1 illustrates a first circuit embodiment of a lighting apparatus.

Please refer to FIG. 1, which shows a first embodiment of a lighting apparatus.

In FIG. 1, the AC-DC converter 7711 is connected to a diode, a first capacitor C1, a second capacitor C2. In addition, there are a mixing unit 7712, a power supply 7712, a power supply 7713, and a controller 7714 that form a driver 77100 for controlling LED modules 77200.

Figure 2:
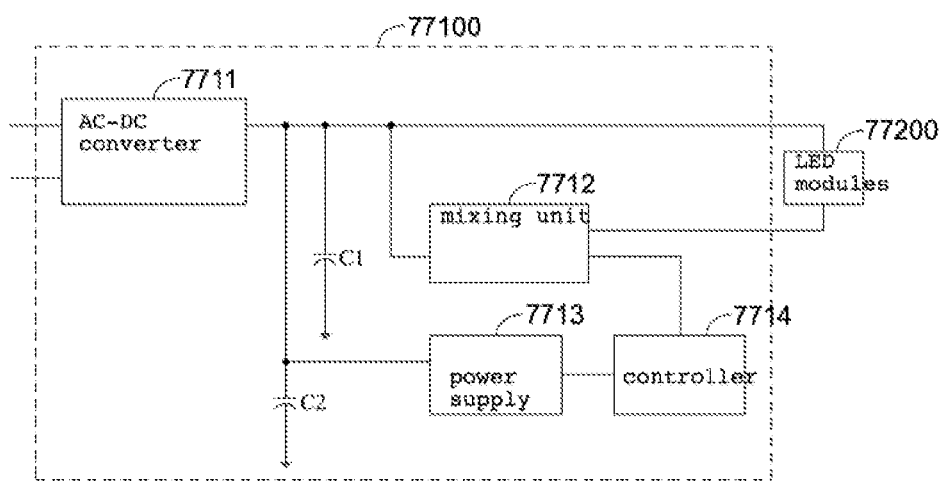
FIG. 2 illustrates a second circuit embodiment of a lighting apparatus.

Please refer to FIG. 2, which shows a second embodiment of a lighting apparatus.

The example in FIG. 2 is similar to the example of FIG. 1, except the diode D1 in FIG. 1.

Figure 3:
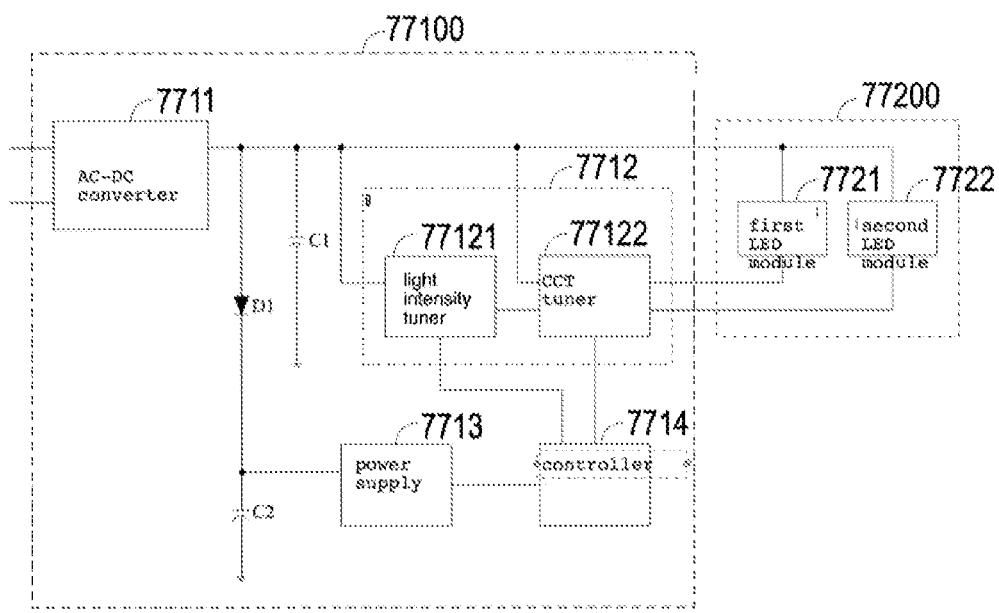
FIG. 3 illustrates a third circuit embodiment of a lighting apparatus.

Please refer to FIG. 3, which shows another lighting apparatus. In FIG. 3, the AC-DC converter 7711 is connected to a diode D1, a first capacitor C1, a second capacitor C2 and other components.

The LED modules 77200 includes a first LED module 7721 and a second LED module 7722. The mixing unit 7712 includes a light intensity tuner 77121 and a CCT (color temperature) tuner 77122. The power supply 7713 provides a working power to the controller 7714.

FIG. 4 shows a detailed circuit example. The AC-DC converter 7711 includes a fuse FR1, a second resistor R2, a first capacitor C11, a bridge circuit BD1, a first resistor R1 and a first inductor L1.

The light intensity tuner 77121 includes a chip U1, a third resistor R3, a fourth resistor R4, a third capacitor C3, a fourth capacitor, a seventh resistor R7, a second diode D2, a second inductor L2, a fifth capacitor C5, an eighth resistor R8, a fifth resistor R5 and a sixth resistor R6.

The CCT tuner 77122 includes a second chip U2, a ninth resistor R9, a tenth resistor R10, an eleventh resistor R11, a sixth capacitor C6, a seventh capacitor C7, an eighth capacitor C8, a thirteenth resistor R13 and a twelfth resistor R12.

The power supply 7713 includes a third chip U3, a fourteenth resistor R14, a fifteenth resistor R15, a ninth capacitor C9, a Zener diode D3, a third inductor L3, a fourth diode D4, a tenth capacitor C10, a sixteenth resistor R16.

The controller 7714 includes an RF antenna ANT.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
    an AC-DC converter for converting an AC power source to a DC output;
    multiple LED modules of different light parameters;
    a mixing unit coupled to the multiple LED modules for mixing a mixed light parameter according to a control signal by supplying driving currents to the multiple LED modules corresponding to the mixed light parameter, wherein the mixing unit receives the DC output to generate the driving currents;
    a controller for generating the control signal;
    a power supply for receiving the DC output to generate a working power to the controller, wherein when the AC-DC converter is turned off, a releasing power of the mixing unit is moved to the power supply to align turn-off timings of the power supply and the mixing unit.

2. The lighting apparatus of claim 1, wherein the DC output is coupled to a common capacitor shared by the power supply and the mixing unit.

3. The lighting apparatus of claim 2, wherein a Zener diode is disposed between the common capacitor and the DC output to speed up a turn-off response timing.

4. The lighting apparatus of claim 1, wherein a first end of a first capacitor is connected to the DC output and a second end of the first capacitor is connected to ground.

5. The lighting apparatus of claim 4, wherein a first diode is placed between the DC output and the first end of the first capacitor.

6. The lighting apparatus of claim 5, wherein a first end of a Zener diode is connected to the first end of the first capacitor, wherein a second end of the Zener diode is connected to an input of the power supply.

7. The lighting apparatus of claim 6, wherein an anode of the first diode is connected to a first end of a second capacitor, wherein a second end of the second capacitor is connected to the ground.

8. The lighting apparatus of claim 7, wherein the first end of the second capacitor is connected to the input of the power supply.

9. The lighting apparatus of claim 5, wherein a first end of a second capacitor is connected to an input of the power supply, wherein a second end of the second capacitor is connected to the ground.

10. The lighting apparatus of claim 9, wherein the first end of the second capacitor is connected to an input of the mixing unit.

11. The lighting apparatus of claim 9, wherein the input of the mixing unit are coupled to the input of the power supply.

12. The lighting apparatus of claim 1, wherein the controller comprises a wireless receiver for receiving an external command, wherein the controller decodes the wireless command to generate multiple control signals corresponding to the driving currents supplied to the multiple LED modules.

13. The lighting apparatus of claim 12, wherein the mixing unit comprises a constant current source controlled by the multiple control signals.

14. The lighting apparatus of claim 12, wherein the controller has a wall switch input for connecting to a wall switch, wherein the an operation of the wall switch triggers a control operation to the multiple LED modules.

15. The lighting apparatus of claim 14, wherein the controller adjusts the multiple control signals by reference to the operation of the wall switch.

16. The lighting apparatus of claim 1, wherein the AC-DC converter comprises a bridge circuit.

17. The lighting apparatus of claim 1, wherein the mixed light parameter comprises a mixed color temperature.

18. The lighting apparatus of claim 17, wherein the light parameter further comprises a mixed color.

19. The lighting apparatus of claim 17, wherein the controller references a mapping table defining a relation between the mixed color temperature and the mixed color.

20. The lighting apparatus of claim 19, wherein the controller determines the mixed color according to the mixed color temperature and the mapping table.

* * * * *